United States Patent
Wiener et al.

(10) Patent No.: US 8,928,728 B2
(45) Date of Patent: Jan. 6, 2015

(54) SYSTEMS, METHODS, AND MEDIA FOR CONTROLLING A PRESENTATION OF DATA IMAGES IN A VIDEO STREAM

(75) Inventors: Yair Wiener, Qiryat Ono (IL); Ori Modai, Ramat-Hasharon (IL); Sagee Ben-Zedeff, Givataim (IL)

(73) Assignee: Avaya Inc., Santa Clara, CA (US)

( * ) Notice: Subject to any disclaimer, the term of this patent is extended or adjusted under 35 U.S.C. 154(b) by 851 days.

(21) Appl. No.: 13/168,810

(22) Filed: Jun. 24, 2011

(65) Prior Publication Data
US 2012/0023541 A1 Jan. 26, 2012

Related U.S. Application Data

(63) Continuation-in-part of application No. 12/790,624, filed on May 28, 2010.

(51) Int. Cl.
*H04N 7/14* (2006.01)
(52) U.S. Cl.
USPC ..................................... 348/14.12; 348/14.08
(58) Field of Classification Search
USPC ...................... 348/14.12, 14.13, 14.01, 14.08
See application file for complete search history.

(56) References Cited

U.S. PATENT DOCUMENTS

| 8,527,649 B2 * | 9/2013 | Wexler et al. ................. 709/231 |
| 2006/0095949 A1 | 5/2006 | Whish-Wilson et al. |
| 2010/0169410 A1 | 7/2010 | Lund et al. |

OTHER PUBLICATIONS

PCT International Search Report, PCT/IB2012/002082, Mar. 4, 2013, 8 pages.

* cited by examiner

*Primary Examiner* — Olisa Anwah (57) ABSTRACT

Systems for controlling a presentation of data images in a video stream, comprising: at least one processor programmed to: transmit a video bit stream representing a plurality of images to a plurality of receivers using common transmission parameters; determine that a transmission link to one of the plurality of receivers is degraded; select one of the plurality of images for transmission to the one of the plurality of receivers; select degraded-link transmission parameters for transmission of the one of the plurality of images on the degraded transmission link, wherein the degraded-link transmission parameters are different from the common transmission parameters; transmit the one of the plurality of images to the one of the plurality of receivers using the degraded-link transmission parameters; and continue to transmit the video bit stream to at least one other of the plurality of receivers using the common transmission parameters.

21 Claims, 6 Drawing Sheets

SYSTEMS, METHODS, AND MEDIA FOR CONTROLLING A PRESENTATION OF DATA IMAGES IN A VIDEO STREAM

CROSS REFERENCE TO RELATED APPLICATION

This application is a continuation-in-part of U.S. patent application Ser. No. 12/790,624, filed May 28, 2010, which is hereby incorporated by reference herein in its entirety.

TECHNICAL FIELD

The disclosed subject matter relates to systems, methods, and media for controlling a presentation of data images in a video stream.

BACKGROUND

In various domains, data is shared between remote participants using existing video channels. To achieve this, data is captured, and then encoded using a standard video encoder as if it was natural video. The remote party receives the video and the data (e.g., as data images making up a data video) using a video decoder. However, in these scenarios, because the data is a real-time video stream, a user cannot easily browse the data (for instance, slides in a presentation), review data that was previously presented (for instance, when arriving late for a video conference), distribute data presented (for instance, during a video conference) after it was shared, etc.

Also, because such video streams are typically transmitted to multiple receivers using the same transmission parameters (e.g., codec, resolution, bit rate, frame rate, transmission protocol, etc.), when the transmission parameters for a video stream are modified to compensate for a degraded transmission link to a single receiver, the transmission parameters for all receivers end up being modified. Unfortunately, however, this can result in a reduced bit rate being used to encode the video stream to all of the receivers, thus causing degradation in stream quality to all of the receivers. Additionally, due to loss of sync between the transmitter and the receiver coupled to the degraded transmission link resulting from packet losses, a large number of video refreshes (e.g., using Intra frames) may be experienced at all of the receivers.

SUMMARY

Systems, methods, and media for controlling a presentation of data images in a video stream are provided. In accordance with some embodiments, systems for controlling a presentation of data images in a video stream, comprising: at least one processor programmed to: transmit a video bit stream representing a plurality of images to a plurality of receivers using common transmission parameters; determine that a transmission link to one of the plurality of receivers is degraded; select one of the plurality of images for transmission to the one of the plurality of receivers; select degraded-link transmission parameters for transmission of the one of the plurality of images on the degraded transmission link, wherein the degraded-link transmission parameters are different from the common transmission parameters; transmit the one of the plurality of images to the one of the plurality of receivers using the degraded-link transmission parameters; and continue to transmit the video bit stream to at least one other of the plurality of receivers using the common transmission parameters.

In accordance with some embodiments, methods for controlling a presentation of data images in a video stream, comprising: transmitting a video bit stream representing a plurality of images to a plurality of receivers using common transmission parameters using a processor programmed to do so; determining that a transmission link to one of the plurality of receivers is degraded using a processor programmed to do so; selecting one of the plurality of images for transmission to the one of the plurality of receivers using a processor programmed to do so; selecting degraded-link transmission parameters for transmission of the one of the plurality of images on the degraded transmission link, wherein the degraded-link transmission parameters are different from the common transmission parameters, using a processor programmed to do so; transmitting the one of the plurality of images to the one of the plurality of receivers using the degraded-link transmission parameters using a processor programmed to do so; and continuing to transmit the video bit stream to at least one other of the plurality of receivers using the common transmission parameters using a processor programmed to do so.

In accordance with some embodiments, computer-readable media containing computer-executable instructions that, when executed by a processor, cause the processor to perform a method for controlling the presentation of data images in a video stream, the method comprising: transmitting a video bit stream representing a plurality of images to a plurality of receivers using common transmission parameters; determining that a transmission link to one of the plurality of receivers is degraded; selecting one of the plurality of images for transmission to the one of the plurality of receivers; selecting degraded-link transmission parameters for transmission of the one of the plurality of images on the degraded transmission link, wherein the degraded-link transmission parameters are different from the common transmission parameters; transmitting the one of the plurality of images to the one of the plurality of receivers using the degraded-link transmission parameters; and continuing to transmit the video bit stream to at least one other of the plurality of receivers using the common transmission parameters.

DETAILED DESCRIPTION

In accordance with various embodiments, mechanisms for controlling the presentation of data images in a video stream are provided. These mechanisms can be used in a variety of applications such as to allow for online browsing of data images, to allow for late arrivals in a video conference to receive data that was previously shown, to allow for later distribution of data images provided in a video conference, to allow browsing through a recorded video conference call using data images as an index, and to provide images to a receiver connected through a degraded transmission link.

Figure 1:
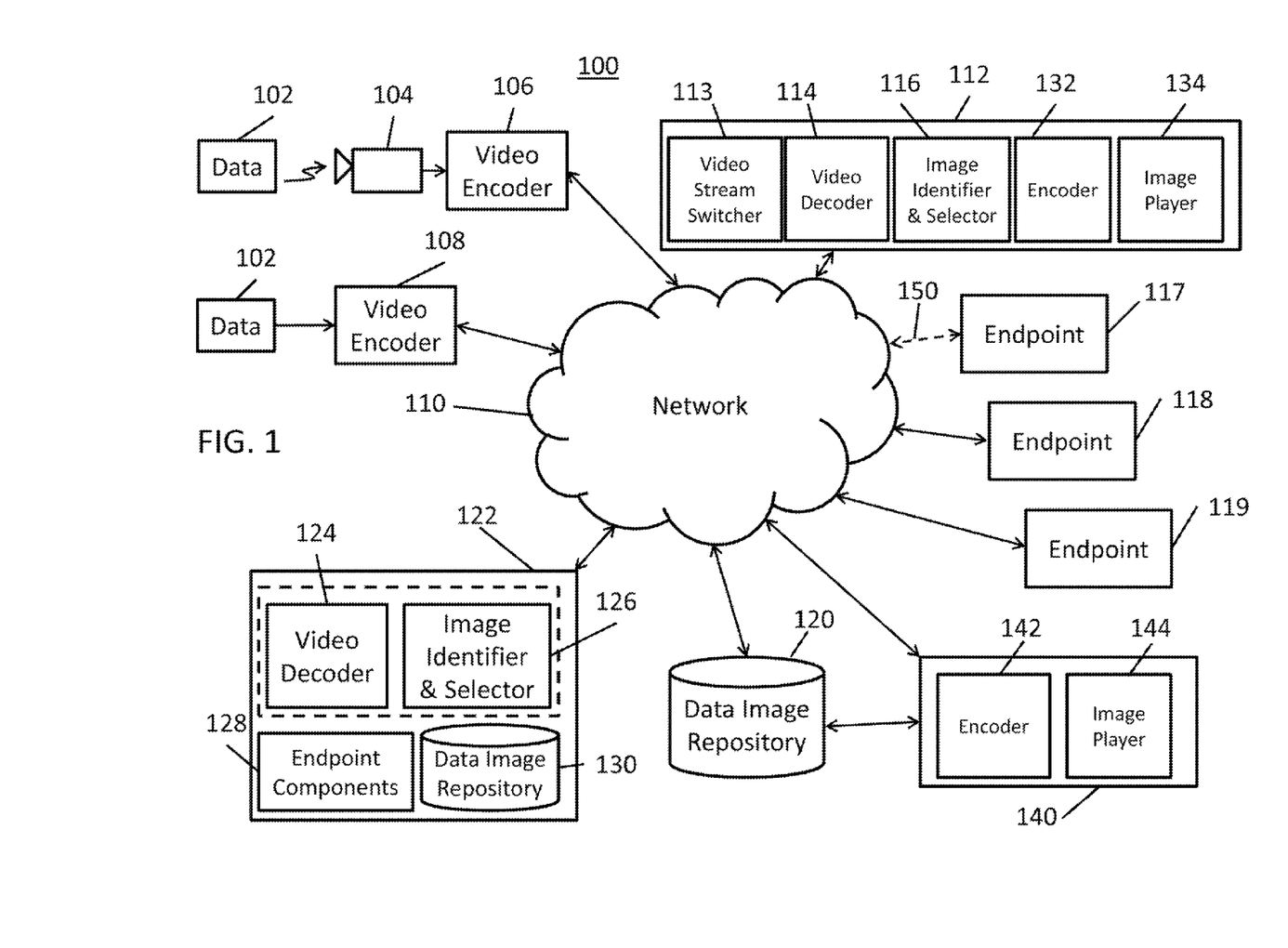
FIG. 1 is a diagram of hardware that can be used in some embodiments.

Turning to FIG. 1, an example of hardware 100 that can be used in some embodiments is illustrated. As shown, data 102 can be provided to a video encoder 106 using a camera 104 or data 102 can be provided to a video encoder 108 directly. The data can be any suitable data and may be in the form of a visual presentation (e.g., such as a POWERPOINT presentation). Camera 104 can be any suitable camera, such as a video camera. Video encoders 106 and 108 can be any suitable hardware and/or software video encoders and may utilize any suitable video encoding standard(s) and/or coder(s)/decoder(s) (codec(s)) for creating a video signal and/or compressing the signal. In some embodiments, camera 104 and/or video encoders 106 or 108 can be part of a video conferencing endpoint.

After the data is encoded, a bit stream may be provided by the video encoder. This bit stream may be transmitted via a network 110. Any suitable network and/or combination of networks may be used as network 110 in some embodiments. For example, network 110 may include the Internet, a wired network, a wireless network, a local area network, a wide area network, a telephone network, a cable network, a satellite network, a fiber optic network, etc. In some embodiments, network 110 can include any suitable equipment such as routers, firewalls, servers, proxy servers, multipoint conferencing units, gateways, etc. Portions of network 110 include links that connect the various components shown in FIG. 1. These links can include portions of networks and/or equipment described above.

The bit stream may then be received by network appliance 112. Network appliance 112 may be any suitable device or part of any suitable device. For example, appliance 112 may be a server. Appliance 112 may include a video stream switcher 113, a video decoder 114, and an image identifier and selector 116.

Distribution of the bit stream may be controlled by video stream switcher 113. Switcher 113 can be any suitable device for controlling the routing of the bit stream. Using switcher 113, the stream can be routed to one or more end points, such as endpoints 117, 118, 119, and 122, and/or to video decoder 114.

Endpoints 117, 118, 119, and 122 may include any suitable hardware and/or software for implementing a video conferencing endpoint. These endpoints may be any suitable device or part of any suitable device. For example, the endpoints may be computers, mobile devices, desktop clients, streaming clients, etc. that are configured as video conferencing endpoints.

In endpoint 122, functions for implementing a video conferencing endpoint can be provided by endpoint components 128. Endpoint 122 may also include a video decoder 124, an image identifier and selector 126, and a data image repository 130.

Video decoders 114 and 124 may be any suitable hardware and/or software video decoders for decoding the video bit stream into a series of video images. Video decoders 114 and 124 may utilize any suitable video encoding standard(s) and/or coder(s)/decoder(s) (codec(s)). For example, the video decoders may include a decoder that matches the encoder in video encoder 106 or 108.

Image identifier and selector 116 and 126 may be any suitable hardware and/or software for identifying and selecting images. For example, the image identifier and selectors may identify and select images as described herein in connection with FIGS. 3 and 5.

In some embodiments, network appliance 112 can further include an encoder 132 and an image player 134. Encoder 132 can be used to encode an image selected by image identifier and selector 116 in any suitable format (e.g., as described below in connection with FIG. 6). Image player 134 can be used to transmit an image encoded by encoder 132 to one or more endpoints.

In some embodiments, a separate encoder and player unit 140 can also be included in hardware 100. Unit 140 can include an encoder 142 and an image player 144 that are similar to encoder 132 and image player 134, respectively, in some embodiments.

Hardware 100 may also include a data image repository 120 additionally or alternatively to data image repository 130. Data image repositories 120 and 130 may be any suitable storage mechanisms for storing data images. For example, data image repositories 120 and 130 may include a mass storage device (such as a disk drive, an optical drive, magnetic media, memory, etc.) and database logic (such as database hardware and/or software). In some embodiments, data image repository 120 and/or any other suitable storage device can include a recorded copy of a video conference of which a bit stream may be a part.

In some embodiments, various components (such as video encoders 106 and 108, video stream switcher 113, video decoders 114 and 124, image identifier and selectors 116 and 126, encoders 132 and 142, image players 134 and 144, endpoints 117, 118, and 119, endpoint components 128, and data image repositories 120 and 130) of hardware 100 can be implemented in one or more general purpose devices such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc., and can be configured to operate in response to software instructions consistent with the functionality described herein.

Figure 2:
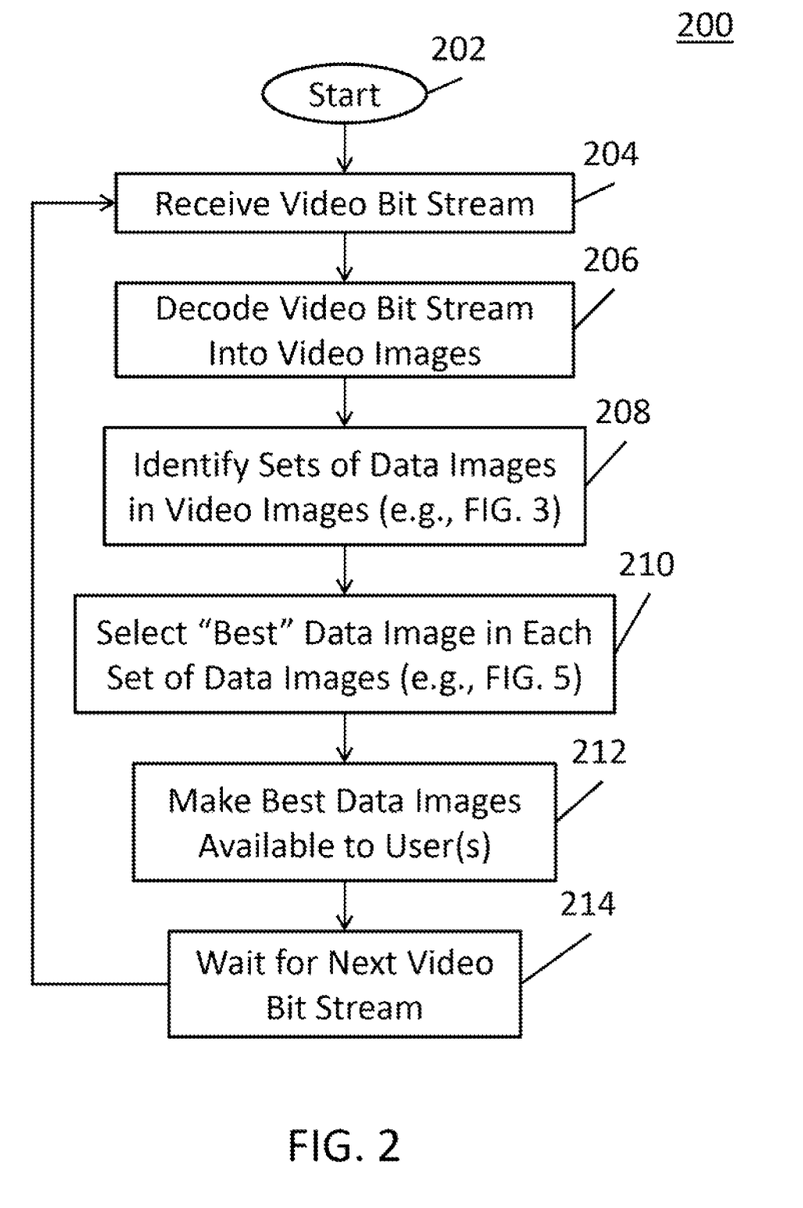
FIG. 2 is a diagram of a process for processing a video bit stream in accordance with some embodiments.
Figure 3:
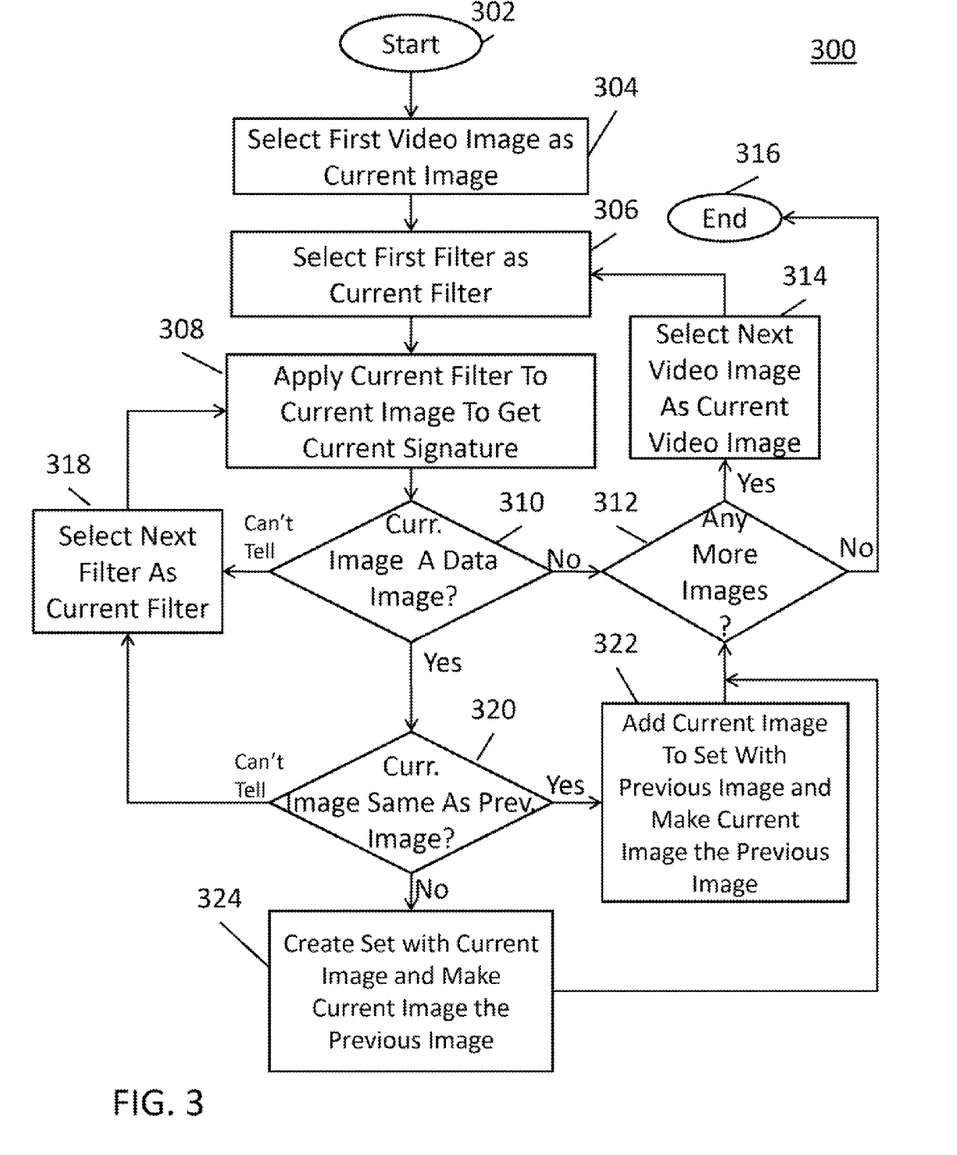
FIG. 3 is a diagram of a process for identifying sets of data images in accordance with some embodiments.

FIG. 2 illustrates an example of a process 200 that can be performed by network appliance 112 and/or endpoint 122 in some embodiments. As shown, after process 200 begins at 202, the process receives a video bit stream at 204. The video bit stream can be received in any suitable manner, such as through a transmission over network 110. Next, at 206, the video bit stream can be decoded into video images. Any suitable decoding can be used in some embodiments. Then, sets of data images can be identified in the video images at 208. Any suitable approach to identifying data images can be used in some embodiments. For example, sets of data images can be identified using a process 300 as illustrated in FIG. 3.

In some embodiments, process 300 can use filters to evaluate video images. For example, filters can be used to determine if a video image is a data image. As another example, filters can be used to determine if a current image is the same as a previous image by comparing signatures for the images. Any number of signatures (including none) can be used in a filter, and different filters can use different signatures. A signature can be any suitable representation of an image. For example, in some embodiments, a signature can be derived from coding information available for the image, such as frame type, frame size, macro block (MB) types, etc., and/or pixel-level information for the image, such as average pixel intensity, pixel diversity, etc. In some embodiments, what a signature is based on can be predetermined, can be determined arbitrarily, or can be determined based on content of an image. For example, assuming average pixel intensity for a column is a signature for a certain filter, column selection can be arbitrary (for example, every n-th column) or according to the content in the image (for example, based on pixel diversity in each column).

Different filters can have different levels of complexity C, in some embodiments, in order to achieve different rates of false positives FP and false negatives FC. False positives are images that are detected as data images, but are in fact not such. False negatives are images that are data images, but are not detected as such.

In some embodiments, filters can be used in a sequential order of passes on an image so that the first filter is the least complex, the next filter is more complex, and subsequent filters are progressively more complex. In this way, if a first filter can be used to determine that a current image is the same (or not the same) as a previous image, then more complex filters do not need to be used.

Figure 4:
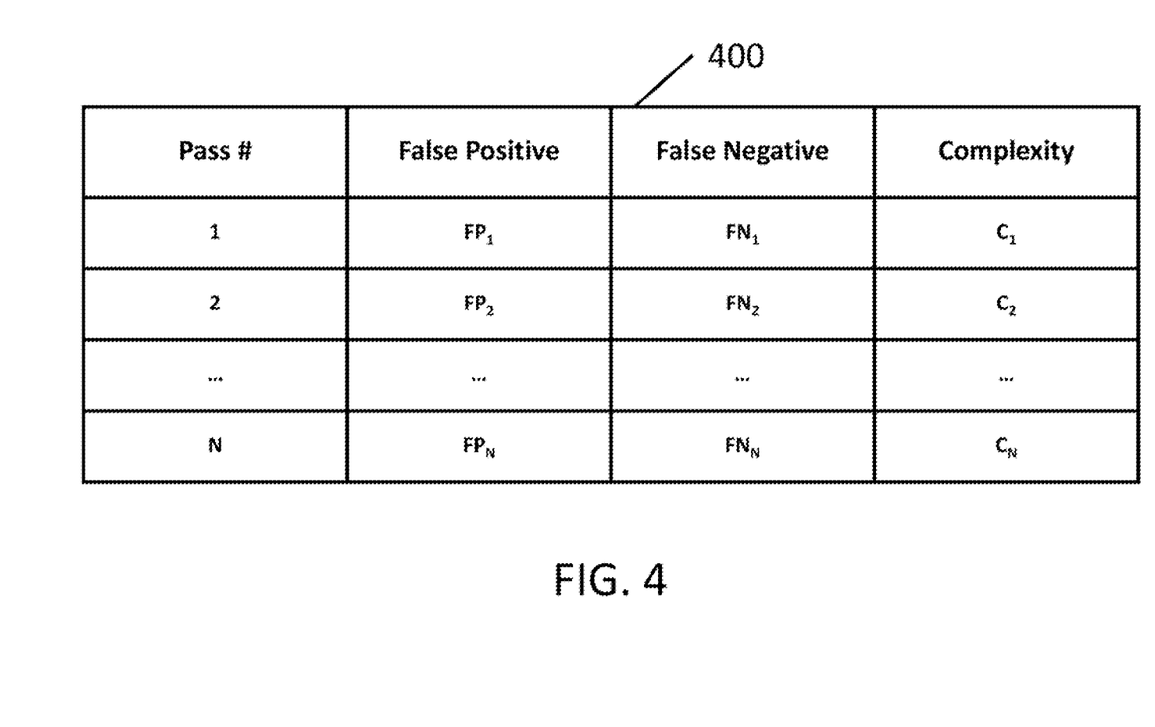
FIG. 4 is a diagram of a table showing filter passes and false positive rates, false negative rates, and complexities associated with those filter passes in accordance with some embodiments.

FIG. 4 shows a table 400 providing an example of filters for passes 1 through N that can be used to evaluate an image. These filters can have false positive rates $FP_1$ through $FP_N$, false negative rates $FN_1$ through $FN_N$, and complexities $C_1$ through $C_N$, where $FP_1 > FP_2 > \ldots > FP_N$, $FN_1 <= FN_2 <= FN_N$, and $C_1 < C_2 < \ldots < C_N$.

Returning to FIG. 3, after process 300 begins at 302, the process can select a first video image as a current image at 304. Next, process 300 can create a set with the current image and make the current image the previous image at 306. Then, at 308, process 300 can determine if there are any more images, and, if not, end at 310. Otherwise, process 300 can select the next video image as the current image at 312.

Next, at 314, a first filter can be selected as a current filter. The first filter can be selected based on any suitable criteria or criterion, such as level of complexity, false positive rate, false negative rate, signature used, etc. The current filter can then be applied against the current image to get one or more current signatures at 316. As described above, any suitable type of signature can be obtained.

Process 300 can next determine if the current image is different from the previous image at 318. Any suitable approach to making this determination can be used in some embodiments. For example, process 300 can compare the signatures of the current image and the previous image to determine if they are different (versus being identical or similar). If the current image is determined to be the same as the previous image, then process 300 can add the current image to a set with the previous image and make the current image the previous image at 320 and then branch to 308.

If the current image is determined to not be the same as the previous image, then process 300 can determine if there are any more filters to be applied at 322. If so, then process 300 can select the next filter as the current filter at 324 and loop back to 316. Otherwise, process can loop back to 306 to create a set with the current image and make the current image the previous image.

In some embodiments, animation, sharpening, and other video effects that may be present in data images can be ignored when comparing a current image to a previous image in order to determine whether they should be in the same set. Any suitable approach to determining what animation, sharpening, or other video to ignore, and how to do so, can be used in some embodiments.

Turning back to FIG. 2, after sets of data images have been identified at 208, such as using process 300 of FIG. 3, process 200 can select the best data image in each set of data images at 210. Any suitable approach to determining the best data images can be used in some embodiments. For example, the best data images in each set of data images can be selected using a process 500 as illustrated in FIG. 5 in some embodiments.

Figure 5:
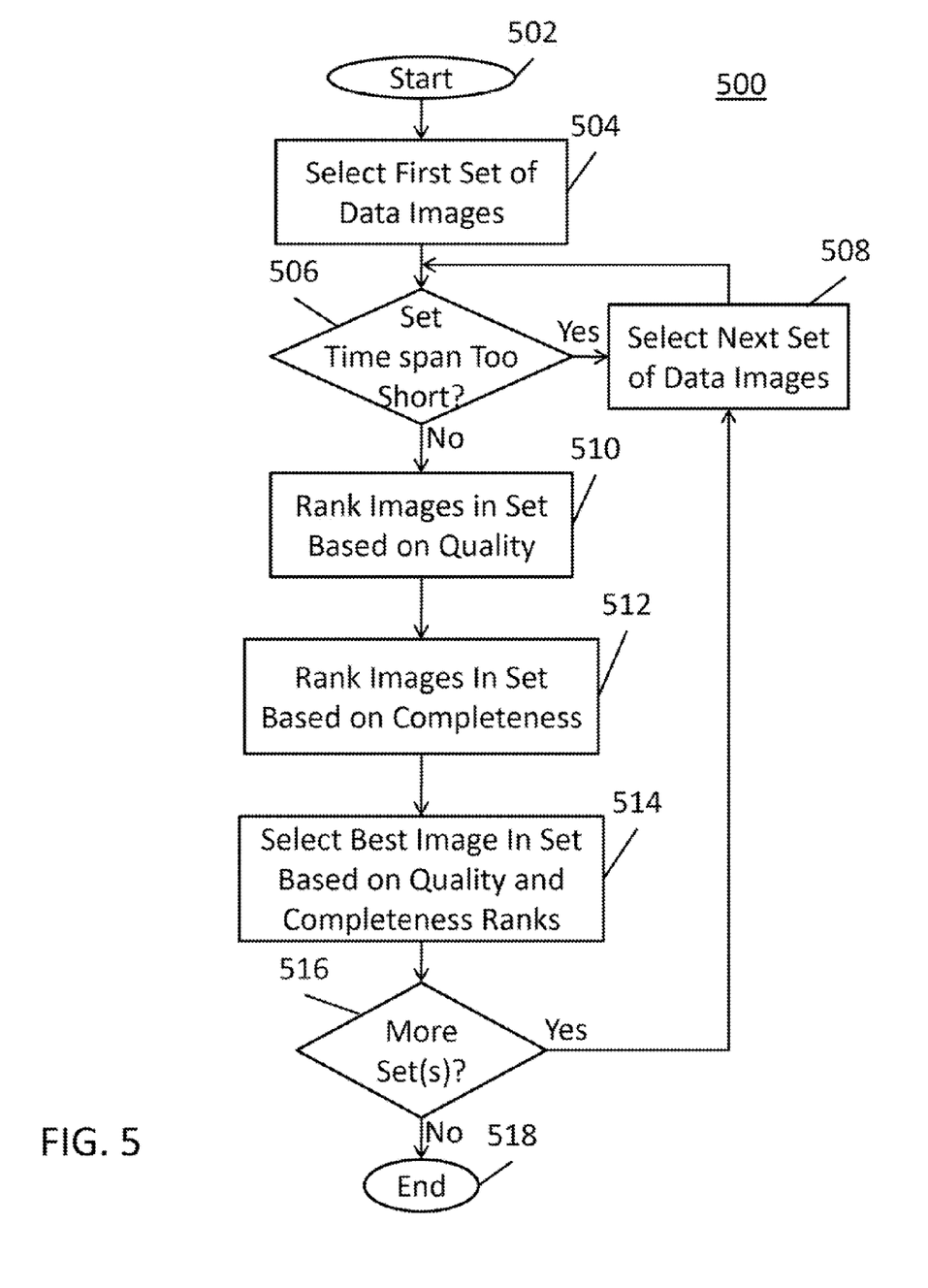
FIG. 5 is a diagram of a process for selecting best data images in sets of data images in accordance with some embodiments.

As shown in FIG. 5, after process 500 begins at 502, the process can select the first set of data images at 504. Next, the process can determine, at 506, if the time span across which the images were taken is too short. For example, if a data image appeared for half a second, then the image would not be viewable to a human and thus the image is unlikely to be a valid data image. Any suitable time frame can be used as a basis for determining whether the time span is too short in some embodiments. If it is determined that the time span was too short, then process 500 can select the next set of data images at 508 and repeat the time span evaluation at 506.

If it is determined at 506 that the time span for the set is not too short, then process 500 can rank the images in the set based on quality at 510. Any suitable mechanism can be used to determine the quality of the images. For example, if a series of images in a set have varying levels of sharpness (e.g., because bandwidth limitations have affected sharpness), then the image with the best sharpness can be selected as having the best quality.

Next, at 512, process 500 can rank the images in the set based on completeness. Any suitable mechanism can be used to determine the completeness of images. For example, if data is progressively added to a blank table (for example) in a series of images in a set, the image with the most complete set of data (e.g., the last image) can be selected has having the best completeness.

The best image in the current set can next be selected, at 514, based on the rankings of quality and completeness. For example, a weighted sum of the rankings can be used to find the best image. Alternatively, in some embodiments, only one of these rankings can be used, or some other factor can be used, to select the best image. In some embodiments, an image can even be selected as the best image arbitrarily, for example, by random (or pseudo random) selection, by being the last image in a set, etc.

At 516, process 500 can determine if there are any more sets of images, and, if so, select the next set at 508 and loop back to 506. Otherwise, if there are no more sets, then process 500 can end at 518.

Turning back to FIG. 2, after selecting the best images at 210, process 200 can make the best images available to one or more users at 212. Any suitable approach to doing this can be used in some embodiments. For example, process 200 can store the best images in data image repositories 120 and/or 130. After making the best images available to users at 212, process 200 can wait for the next video bit stream at 214 and then loop back to 204.

Turning back to FIG. 1, in some embodiments, endpoints 117, 118, 119, and/or 122 (the endpoints) can enable a user to perform certain functions based on the best data images being made available to users. For example, the endpoints (and/or any computer) can enable a user to perform online browsing of data, can allow for late arrivals in a video conference to receive data that was previously shown, can be used to receive data provided in a video conference after the video conference is over, and can allow selection of a portion of a recorded video conference call based on a selection of data that corresponds to it.

As illustrated in FIG. 1, a link 150 providing transmissions to an endpoint 117 may become degraded. This can occur for any of a variety of reasons, such as the link becoming overloaded, faulty equipment or connectivity on the link, etc. When this occurs, a video stream being provided to the link may need to be modified to compensate for the degraded link. Such modifications, however, may negatively impact the performance of transmissions or the quality of the content being provided to other endpoints 118 and 119.

Figure 6:
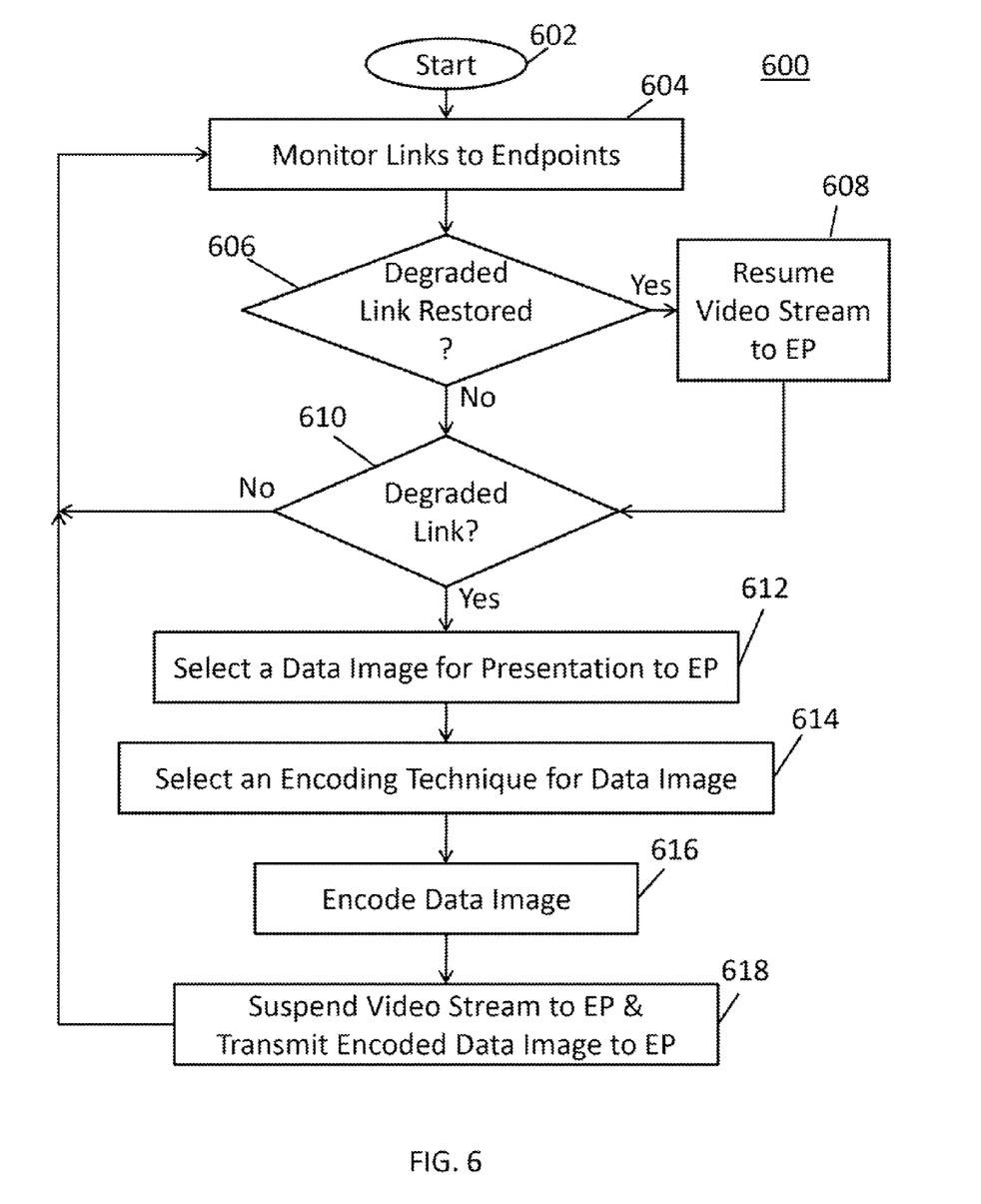
FIG. 6 is a diagram of a process for presenting data images to an endpoint with a degraded link in accordance with some embodiments.

FIG. 6 illustrates an example of a process 600 that can be used to provide data images to such an endpoint 117 without impacting the transmission being provided to other endpoints 118 and 119. Process 600 can be performed by appliance 112 and/or partially by unit 140 in some embodiments.

As shown, after process 600 begins at 602, the process can monitor links to endpoints for degradation, and restoration from degradation, at 604. Any suitable technique for identifying one or more links as being degraded can be used in some embodiments. For example, a link can be determined as being degraded when a specified level of degradation has occurred. Any suitable technique for identifying the level of degradation can be used, and any suitable level of degradation can be used as the specified level, in some embodiments. As another example, techniques described in U.S. patent application Ser. No. 13/151,065, filed Jun. 1, 2011, which is hereby incorporated by reference herein in its entirety, can be used to identify links as being degraded in some embodiments.

Next at 606, it can be determined if a previously degraded link has been restored to non-degraded status. If a previously degraded is determined at 606 to have been restored, process 600 can cause a transmission of a video stream of the data images to be resumed to the endpoint and the link can be designated as non-degraded at 608. If it is determined at 606 that a previously degraded link has not been restored, or after resuming a video stream at 608, process 600 can determine at 610 if an endpoint has a degraded link. If it is determined at 610 that an endpoint does not have a degraded link, then process 600 can loop back to 604.

Otherwise, if it is determined at 610 that an endpoint has a degraded link, process 600 can next select a data image (which can be a first data image or a next data image in the case where a link was previously identified as being degraded) for presentation to the endpoint at 612. Any suitable technique for selecting the data image can be used in some embodiments. For example, the data image can be selected as described above in connection with FIG. 2.

At 614, process 600 can then select an encoding technique for the data image. Any suitable encoding technique can be used in some embodiments. For example, the data image can be encoded as a JPEG image, an IDR frame, a series of IDR and P frames, etc. in some embodiments. Next, at 616, the data image can be encoded using the selected encoding technique.

Next, the video stream being transmitted to the endpoint with the degraded link can be suspended and the encoded data image can be transmitted to that endpoint at 618. Any suitable communication protocol can be used to transmit the encoded data image. For example, UDP, TCP, etc. can be used to transmit the encoded data image. Process 600 can then loop back to 604.

The encoding technique, communication protocol, and/or any other transmission characteristics of a video stream, image being transmitted, etc. can be collectively referred to as transmission parameters of the video steam, image being transmitted, etc.

Once an encoded data image is received by the endpoint, the endpoint can display the encoded data image in the place of a corresponding video stream that was previously received over the degraded link. As each updated encoded data image is received, the updated encoded data image can replace the previous encoded data image.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A system for controlling a presentation of data images in a video stream, comprising:
at least one processor programmed to:
transmit a video bit stream representing a plurality of images to a plurality of receivers using common transmission parameters;
determine that a transmission link to one of the plurality of receivers is degraded;
select one of the plurality of images for transmission to the one of the plurality of receivers, wherein the at least one processor identifies sets of data images in the plurality of images, each of the data images providing an image representation of data and each of the data images in any of the sets of data images corresponding to a single data image, and selects a best data image from the sets of data images as the one of the plurality of images;
select degraded-link transmission parameters for transmission of the one of the plurality of images on the degraded transmission link, wherein the degraded-link transmission parameters are different from the common transmission parameters;
transmit the one of the plurality of images to the one of the plurality of receivers using the degraded-link transmission parameters; and
continue to transmit the video bit stream to at least one other of the plurality of receivers using the common transmission parameters.

2. The system of claim 1, wherein the at least one processor is also programmed to apply a filter to identify the sets of data images.

3. The system of claim 2, wherein the filter uses a signature of an image to evaluate the image.

4. The system of claim 2, wherein the at least one processor is also programmed to apply a second, more complex filter to identify the sets of data images.

5. The system of claim 1, wherein the at least one processor is also programmed to determine if a time span associated with a set of data images is below a threshold.

6. The system of claim 1, wherein selecting the best data image includes evaluating the quality of data images in the sets of data images.

7. The system of claim 1, wherein selecting the best data image includes evaluating the completeness of data images in the sets of data images.

8. A method for controlling a presentation of data images in a video stream, comprising:
- transmitting a video bit stream representing a plurality of images to a plurality of receivers using common transmission parameters using a processor programmed to do so;
- determining that a transmission link to one of the plurality of receivers is degraded using a processor programmed to do so;
- selecting one of the plurality of images for transmission to the one of the plurality of receivers, using a processor programmed to do so, said process of selecting comprising identifying, using said processor programmed to do so, sets of data images in the plurality of images, wherein each of the data images provides an image representation of data and each of the data images in any of the sets of data images corresponds to a single data image, and selecting, using said processor programmed to do so, a best data image from the sets of data images as the one of the plurality of images;
- selecting degraded-link transmission parameters for transmission of the one of the plurality of images on the degraded transmission link, wherein the degraded-link transmission parameters are different from the common transmission parameters, using a processor programmed to do so;
- transmitting the one of the plurality of images to the one of the plurality of receivers using the degraded-link transmission parameters using a processor programmed to do so; and
- continuing to transmit the video bit stream to at least one other of the plurality of receivers using the common transmission parameters using a processor programmed to do so.

9. The method of claim 8, further comprising applying a filter to identify the sets of data images.

10. The method of claim 9, wherein the filter uses a signature of an image to evaluate the image.

11. The method of claim 9, further comprising applying a second, more complex filter to identify the sets of data images.

12. The method of claim 8, further comprising determining if a time span associated with a set of data images is below a threshold.

13. The method of claim 8, wherein selecting the best data image includes evaluating the quality of data images in the sets of data images.

14. The method of claim 8, wherein selecting the best data image includes evaluating the completeness of data images in the sets of data images.

15. A non-transitory computer-readable medium containing computer-executable instructions that, when executed by a processor, cause the processor to perform a method for controlling the presentation of data images in a video stream, the method comprising:
- transmitting a video bit stream representing a plurality of images to a plurality of receivers using common transmission parameters;
- determining that a transmission link to one of the plurality of receivers is degraded;
- selecting one of the plurality of images for transmission to the one of the plurality of receivers, said process of selecting one of the plurality comprising identifying sets of data images in the plurality of images, wherein each of the data images provides an image representation of data and each of the data images in any of the sets of data images corresponds to a single data image, and selecting a best data image from the sets of data images as the one of the plurality of images;
- selecting degraded-link transmission parameters for transmission of the one of the plurality of images on the degraded transmission link, wherein the degraded-link transmission parameters are different from the common transmission parameters
- transmitting the one of the plurality of images to the one of the plurality of receivers using the degraded-link transmission parameters; and
- continuing to transmit the video bit stream to at least one other of the plurality of receivers using the common transmission parameters.

16. The medium of claim 15, wherein the method further comprises applying a filter to identify the sets of data images.

17. The medium of claim 16, wherein the filter uses a signature of an image to evaluate the image.

18. The medium of claim 16, wherein the method further comprises applying a second, more complex filter to identify the sets of data images.

19. The medium of claim 15, wherein the method further comprises determining if a time span associated with a set of data images is below a threshold.

20. The medium of claim 15, wherein selecting the best data image includes evaluating the quality of data images in the sets of data images.

21. The medium of claim 15, wherein selecting the best data image includes evaluating the completeness of data images in the sets of data images.

* * * * *